United States Patent
Hamilton

(10) Patent No.: US 7,203,857 B2
(45) Date of Patent: Apr. 10, 2007

(54) ON-DEMAND CLOCK SWITCHING

(75) Inventor: Neil Hamilton, Kanata (CA)

(73) Assignee: Elliptic Semiconductor Inc., Kanata, Ontario (CA)

(*) Notice: Subject to any disclaimer, the term of this patent is extended or adjusted under 35 U.S.C. 154(b) by 305 days.

(21) Appl. No.: 10/809,697

(22) Filed: Mar. 26, 2004

(65) Prior Publication Data

US 2004/0255177 A1    Dec. 16, 2004

Related U.S. Application Data

(60) Provisional application No. 60/458,004, filed on Mar. 28, 2003.

(51) Int. Cl.
*G06F 1/28* (2006.01)
(52) U.S. Cl. .................. 713/322; 713/323; 713/324
(58) Field of Classification Search ............. 713/322, 713/323, 324
See application file for complete search history.

(56) References Cited

U.S. PATENT DOCUMENTS

| | | | |
|---|---|---|---|
| 6,240,521 B1* | 5/2001 | Barber et al. | 713/323 |
| 6,301,671 B1* | 10/2001 | Boice et al. | 713/322 |
| 6,611,920 B1* | 8/2003 | Fletcher et al. | 713/322 |
| 6,766,460 B1* | 7/2004 | Evoy et al. | 713/323 |
| 6,983,389 B1* | 1/2006 | Filippo | 713/324 |

\* cited by examiner

*Primary Examiner*—Thuan Du
(74) *Attorney, Agent, or Firm*—Freedman & Associates

(57) ABSTRACT

First and second functional circuit blocks (FCBs) control the operation of a clock circuits coupled thereto in dependence upon processing requirements of the FCBs as well as power consumption considerations. When the FCB is not processing data, the clock circuit coupled to that FCB has one of its clock signal frequency reduced or is disabled so that the FCB consumes significantly reduced amounts of electrical power. Through controlling clock frequency and enabling and disabling of the clock circuit, electrical power consumption of the FCB is advantageously reduced.

17 Claims, 9 Drawing Sheets

ON-DEMAND CLOCK SWITCHING

This patent application claims benefit from U.S. Provisional Application No. 60/458,004 filed on Mar. 28, 2003.

FIELD OF THE INVENTION

The invention relates to the area of power consumption of electrical circuits and more specifically in the area of controlling operation of clock circuits in order to control the power consumption of the electrical circuits.

BACKGROUND OF THE INVENTION

Circuits used in electrical devices are typically designed from functional circuit blocks (FCBs), where each of these blocks is designed to carry out predetermined processes within the electrical device. Power consumption plays an increasingly important role in modem devices that are being provided with increased functionality, but must maintain sufficient battery longevity in order for them to be sufficiently useful between battery recharge operations. For instance, cellular telephones have become widespread, but in order for their continued usefulness they must be able to operate for longer periods of time; an issue that becomes more difficult when an ever increasing number of features are integrated therein, such as, for example, color LCD video displays, or encryption processes.

In a majority of electrical circuits that employ FCBs, clock signals are typically provided to each FCB from a clock signal source in order for that FCB to be able to process incoming signals and to provide output signals at output ports thereof. Clock signals controllably oscillate between a first potential and a second potential, the first and second potential on opposing sides of a switching threshold voltage. Furthermore, the clock signal is preferably a square wave type signal, with minimal ringing. Furthermore, FCBs coupled to the clock circuit receive the clock signal and gating circuitry within these FCBs consumes electrical power in response to the clock signal activating the gating circuitry.

It is therefore an object of the invention to provide an electrical device that is made up of a plurality of FCBs with each FCB having its own controllable clock source, where the clock signal is switched to an FCB on demand in dependence upon operational requirements of each FCB from the plurality.

SUMMARY OF THE INVENTION

In accordance with the invention there is provided a computing device comprising: a clock circuit for generating a first clock signal and a second clock signal; a first sub functional block (SFB) having an input port for receiving the first clock signal; a first functional circuit block (FCB) including the first SFB and for operating in accordance with predetermined parameters, the first FCB having a clock control port for providing a first clock control signal and a first clock signal input port for receiving a switchably coupled second clock signal, the first FCB having a circuitry portion for operating in one of a normal mode of operation and in a reduced power consumption mode of operation in dependence upon the switchably coupled second clock signal; and, a first clock control circuit for receiving the second clock signal and for switchably coupling the second clock signal to the first clock signal input port in dependence upon the first clock control signal.

In accordance with the invention there is provided a method of controlling power consumption: providing a first FCB for processing data using a first clock signal provided by a first clock circuit; providing a second FCB for processing data using a second clock signal provided by a second clock circuit; receiving a FCB control signal by the first FCB and the second FCB; determining whether the FCB control signal is for operating of at least one of the first FCB and the second FCB in one of a normal mode of operation and a reduced power consumption mode of operation; and, performing one of enabling of at least one of the first clock circuit and a second clock circuit in dependence upon whether at least one of the first FCB and the second FCB are for operating in the normal mode of operation and varying a frequency of at least one of the first clock circuit and a second clock circuit in dependence upon whether at least one of the first FCB and the second FCB are for operating in the normal mode of operation.

In accordance with the invention there is provided a method comprising: providing a first functional circuit block (FCB) for processing of data using a first clock circuit; providing a second FCB for processing of data using a second clock circuit; and, switchably enabling and disabling the first and second clock circuits independently in dependence upon performance requirements of the first and second FCBs.

In accordance with the invention there is provided a storage medium comprising instruction data stored thereon, the instruction data comprising: first instruction data for providing a first functional circuit block (FCB) for processing of data using a first clock circuit; second instruction data for providing a second FCB for processing of data using a second clock circuit; and, third instruction data for switchably enabling and disabling the first and second clock circuits independently in dependence upon performance requirements of the first and second FCBs.

In accordance with the invention there is provided a storage medium comprising instruction data stored thereon, the instruction data comprising: first instruction data for providing a first FCB for processing data using a first clock signal provided by a first clock circuit; second instruction data for providing a second FCB for processing data using a second clock signal provided by a second clock circuit; third instruction data for receiving a FCB control signal by the first FCB and the second FCB; fourth instruction data for determining whether the FCB control signal is for operating of at least one of the first FCB and the second FCB in one of a normal mode of operation and a reduced power consumption mode of operation; and, fifth instruction data for performing one of enabling of at least one of the first clock circuit and a second clock circuit in dependence upon whether at least one of the first FCB and the second FCB are for operating in the normal mode of operation and varying a frequency of at least one of the first clock circuit and a second clock circuit in dependence upon whether at least one of the first FCB and the second FCB are for operating in the normal mode of operation.

BRIEF DESCRIPTION OF THE DRAWINGS

Exemplary embodiments of the invention will now be described in conjunction with the following drawings, in which.

DETAILED DESCRIPTION THE INVENTION

Figure 1:
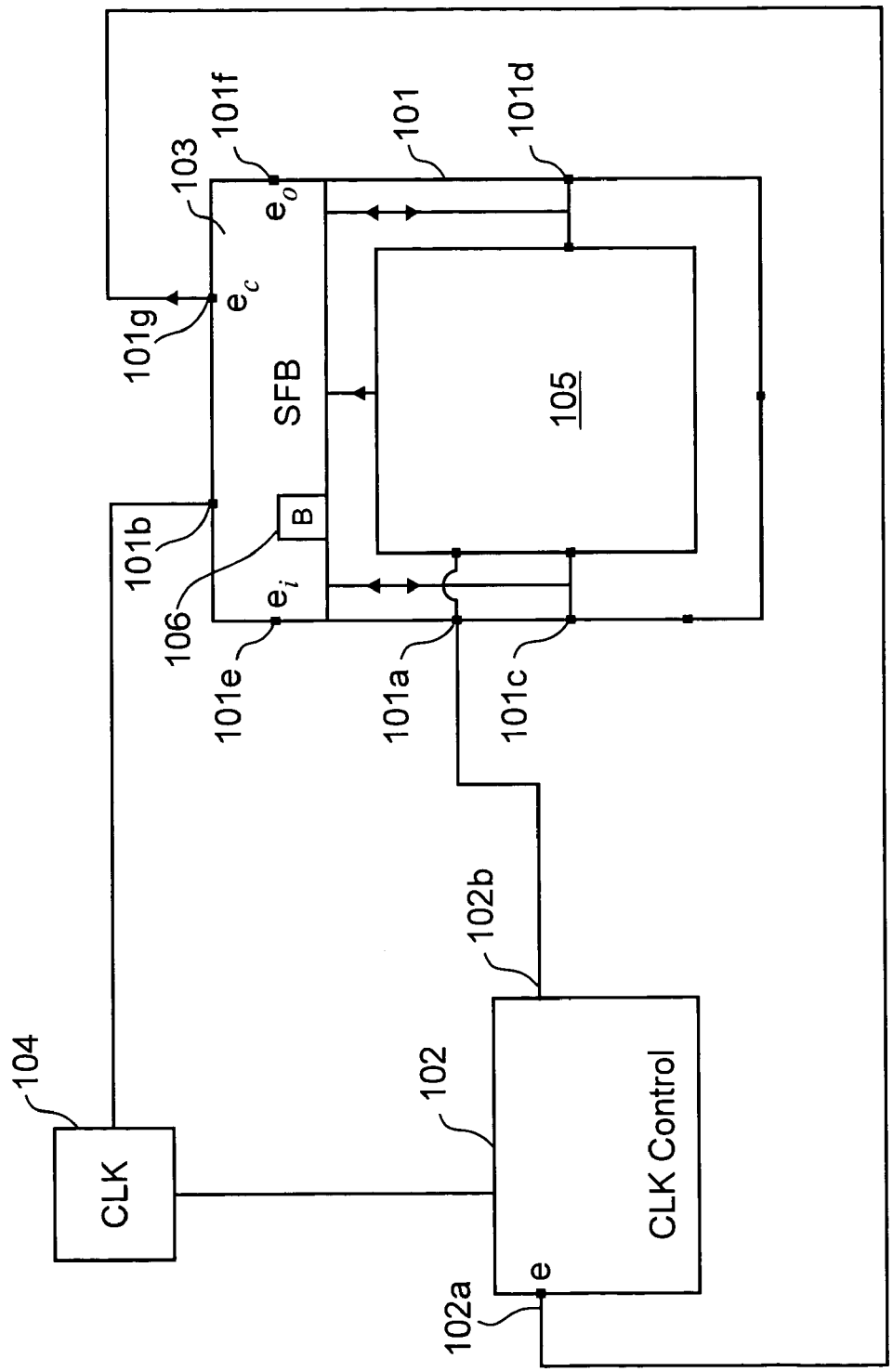
FIG. 1 illustrates an electrical circuit comprised of a FCB (functional circuit block), a clock circuit, and a clock control circuit.

FIG. 1 illustrates an electrical circuit 100 comprised of a FCB 101, a clock control circuit 102 and a clock circuit 104. A sub-functional block (SFB) 103 is preferably disposed within the FCB 101 for implementing a clock control strategy. Additionally within the FCB 101 there is disposed a data processing block (DPB) 105 that is comprised of a majority of the internal circuitry of the FCB 101.

The clock circuit 104 provides a second clock signal to the clock control circuit 102 and a first clock signal to a SFB clock input port 101b disposed on the FCB 101. The first clock signal received on the SFB clock input port 101b is only for being received by circuitry forming the SFB 103. A FCB switched clock input port 101a is disposed on the FCB 101 for receiving of the switched second clock signal from an output port 102b of the clock control circuit 102. The switched second clock signal is for being received by the DPB 105 disposed within the FCB 101. A clock control port 101g is disposed on the SFB 103 for switchably controlling the clock control circuit 102 using a clock control signal generated by the SFB 103. The switchable controlling of the clock control circuit 102 is in dependence upon the clock control strategy implemented within the SFB 103. Preferably, the clock control strategy is for achieving desired power consumption for the FCB 101 as well as for achieving desired data throughput for the FCB 101.

At least one data input port 101c and at least one data output port 101d are provided on the FCB, with each port electrically connected to the DPB 105 and the SFB 103. A buffer memory circuit 106 is preferably disposed within the FCB for buffering of data received from at least one of the data input ports 101c and for buffering of data for being provided from the at least one data output port 101d. The SFB 103 monitors the at least one data input port 101c and the at least one data output port 101d to determine whether buffering of input data or processed data is to be performed.

A FCB control input port 101e is provided for receiving a FCB control signal for enabling and disabling of the DPB portion of the FCB. The SFB is for receiving the FCB control signal and for enabling and disabling of the DPB by switchably coupling and uncoupling the clock signal provided thereto. In an enabled state the FCB operates in a normal mode of operation and consumes a normal amount of electrical power. In a disabled state the FCB operates in a reduced power consumption mode of operation and consumes significantly reduced amounts of electrical power since the DPB is disabled. Of course, the SFB is still enabled and receives the first clock signal from the clock circuit. However the SFB consumes significantly less power as compared to an enabled DPB.

A FCB control output port 101f is also provided for controlling of adjacent FCBs (not shown) coupled therewith, where the SFB 103 uses this port 101f to control adjacent FCBs using the FCB control signal.

Figure 2A:
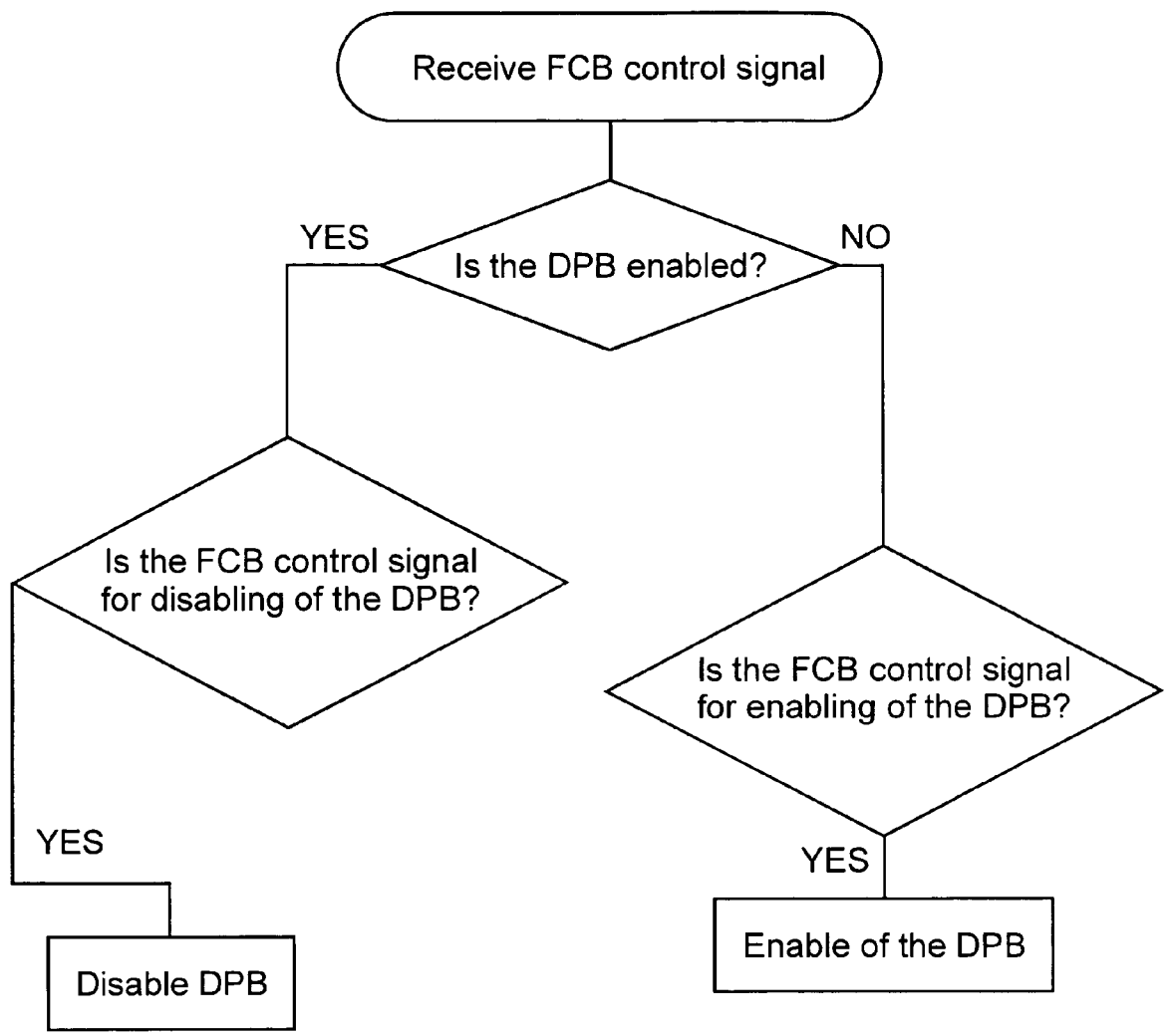
FIG. 2a illustrates FCB operation steps upon a receipt of a FCB control signal.

As illustrated in FIG. 2a, the SFB portion of the FCB receives a FCB control signal. If the DPB is enabled then the FCB determines whether the FCB control signal is for disabling of the DPB, if so, then the FCB disables the DPB, comprised of majority of its internal circuitry, for operating in the reduced power consumption mode of operation. If the FCB is disabled then the SFB determines whether the FCB control signal is for enabling thereof, if so, then the FCB enables the DPB for operating in the normal power consumption mode of operation.

Figure 2B:
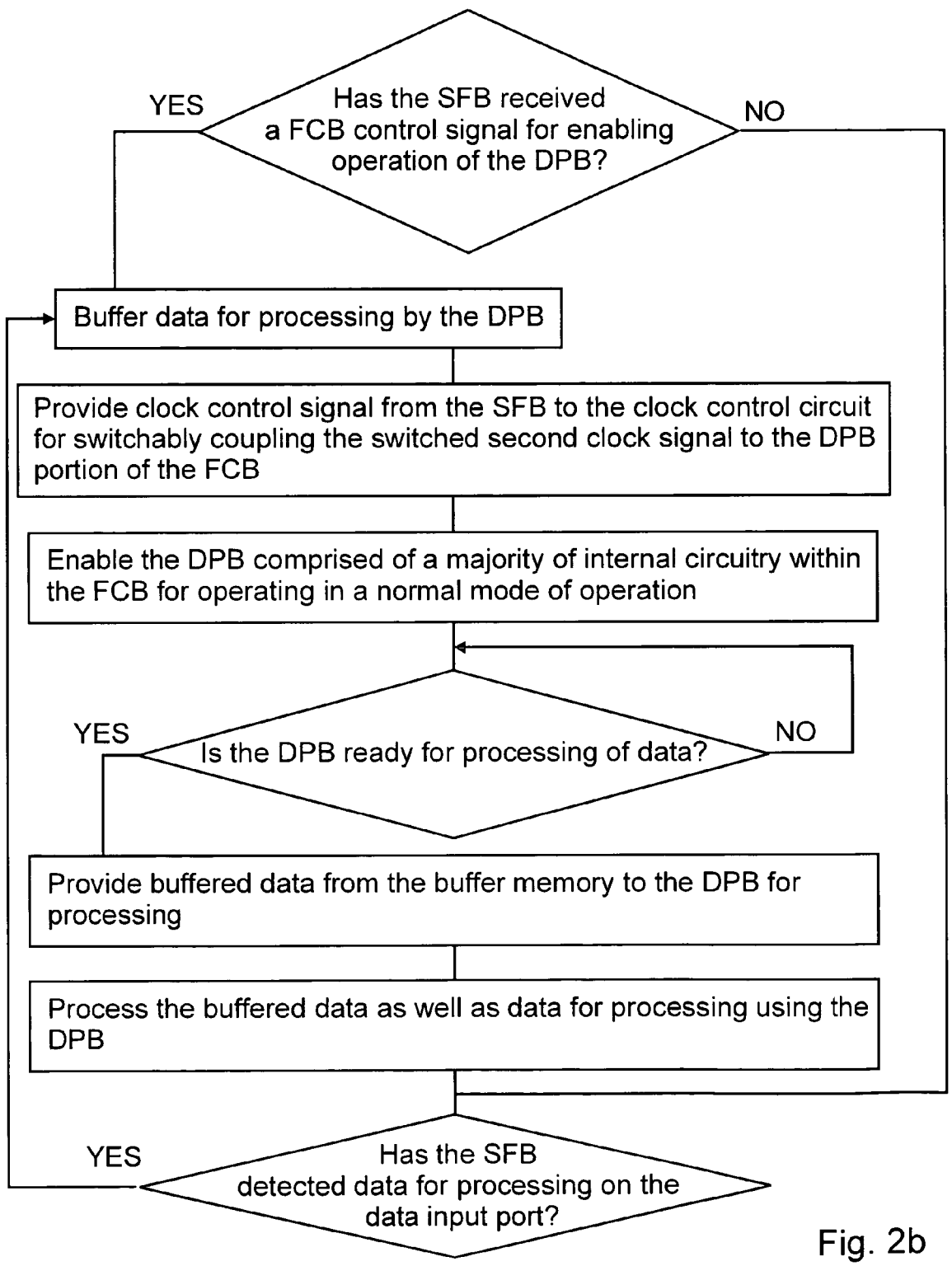
FIG. 2b illustrates FCB operation steps upon enabling of a data processing block (DPB) using the SFB.

FIG. 2b illustrates steps executed for enabling of the DPB. The SFB determines whether to enable of the DPB in dependence upon a received FCB control signal or by detecting data for processing on the at least one data input port of the FCB. The DPB is enabled by providing a clock control signal form the SFB to the clock control circuit for switchably coupling the second clock signal to the DPB. In either case, when the SFB switchably couples the second clock signal to the DPB, data for processing by the DPB is buffered by the buffer memory circuit. Once the SFB has determined that the internal circuitry of the DPB has stabilized and the DPB is ready for processing of data, the buffered data, as well as data for processing, are provided from the buffer memory, as well as from the at least one data input port, to the DPB for processing thereof. The DPB executes processing operations in accordance with predetermined processes defined therein.

Figure 2C:
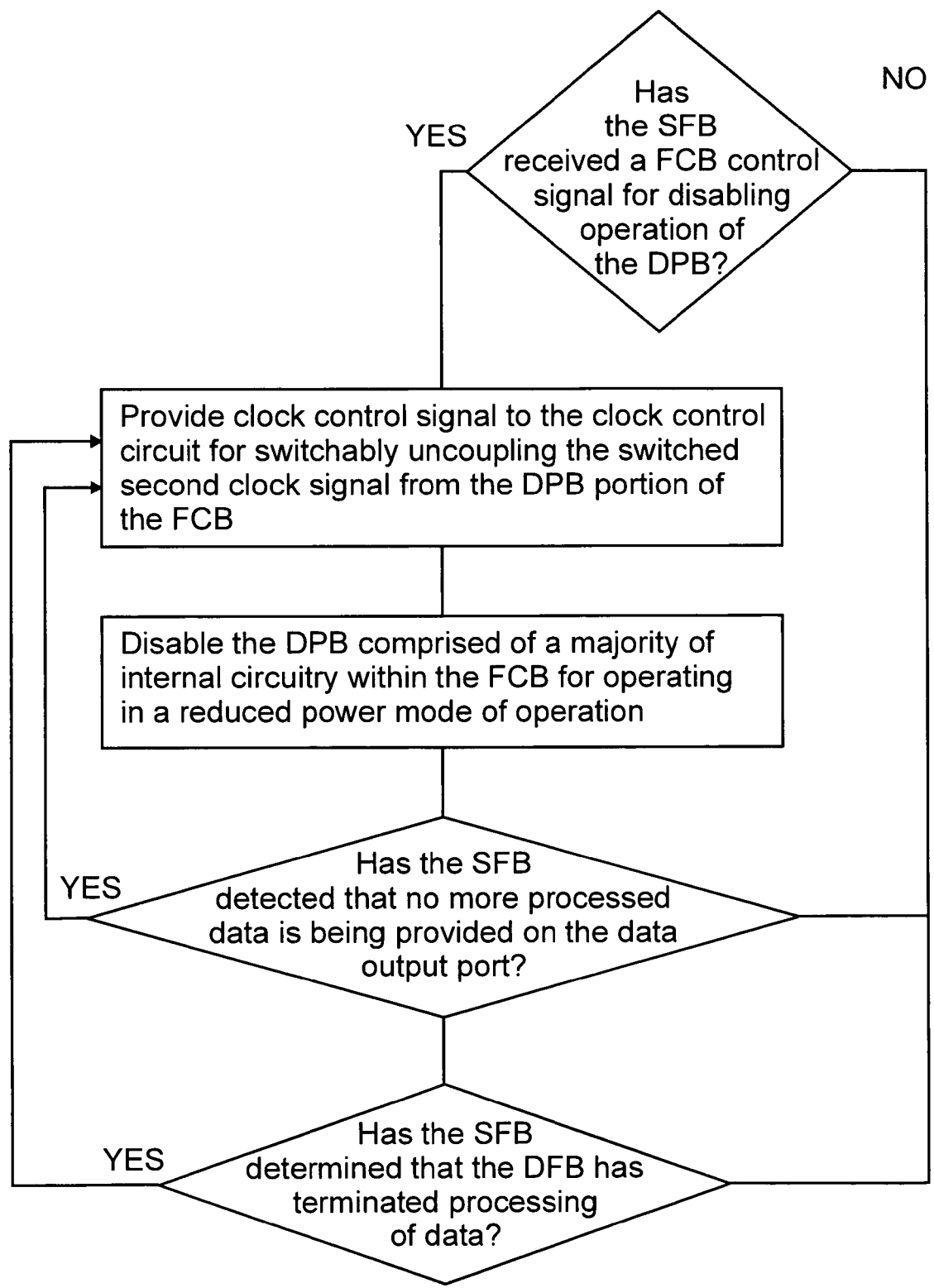
FIG. 2c illustrates FCB operation steps upon disabling of the DPB using the SFB.

FIG. 2c illustrates steps executed for disabling of the FCB and for switchably uncoupling of the switched second clock signal from the FCB. The SFB either monitors the at least one data output port of the FCB for determining whether the DPB has terminated processing of data, or whether a FCB control signal has been received by the SFB for disabling operation of the DPB. In either case, the clock control signal is provided by the SFB to the clock control circuit for switchably uncoupling the switched second clock signal from to the DPB portion of the FCB and the DPB is disabled as a result for operating in a reduced power mode of operation.

Figure 2D:
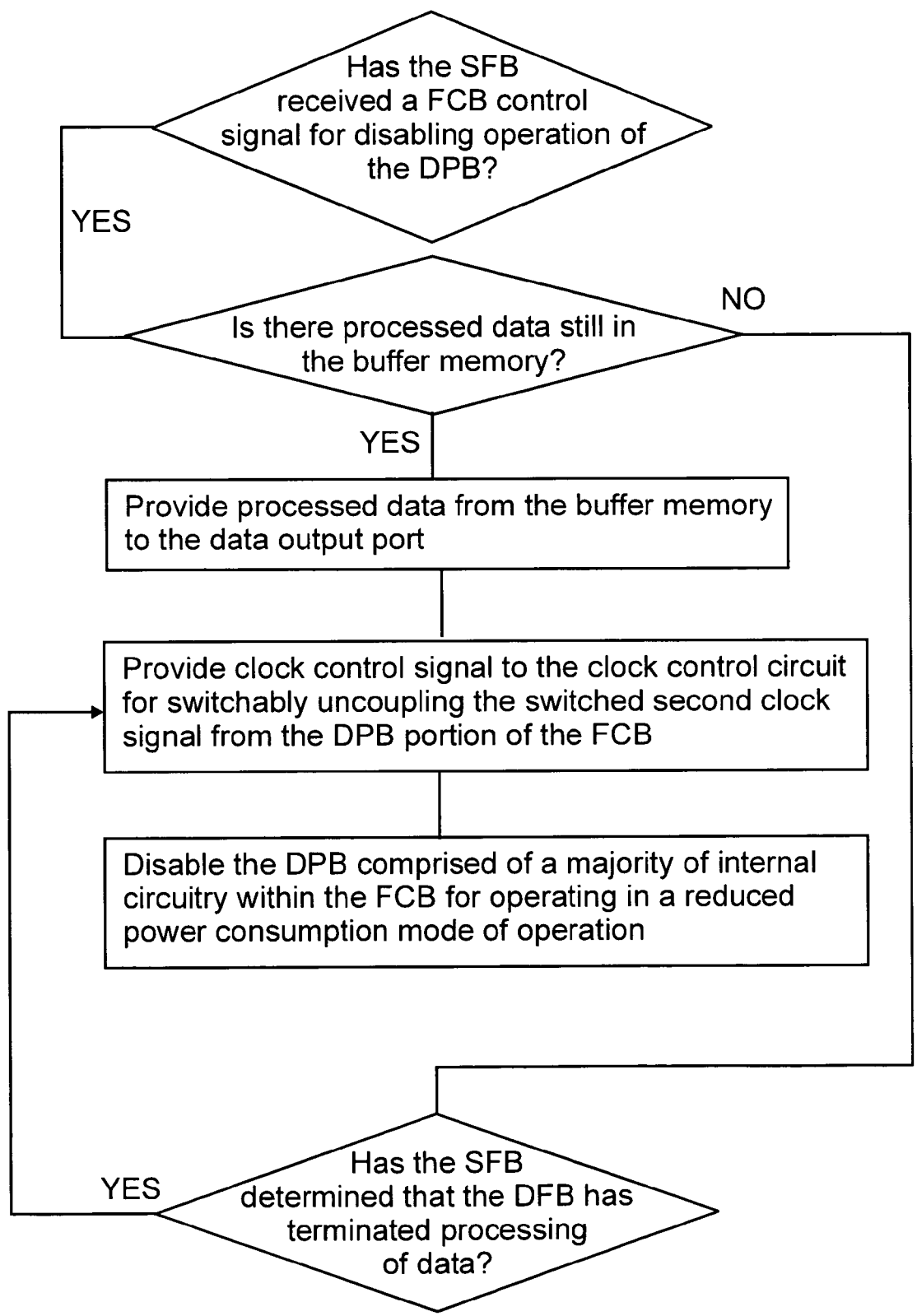
FIG. 2d illustrates FCB operation steps upon disabling of the DPB using the SFB.

FIG. 2d illustrates steps executed for disabling of the FCB and for switchably uncoupling of the switched second clock signal from the FCB. The SFB either monitors the at least one data output port of the FCB for determining whether the DPB has terminated processing of data, or whether a FCB control signal has been received by the SFB for disabling operation of the DPB. In either case, the SFB optionally determines whether there is processed data still in the buffer memory, if so, then this processed data is provided from the buffer memory to the at least one data output port. Otherwise, the clock control signal is provided to the clock control circuit for switchably uncoupling the switched second clock signal from to the DPB portion of the FCB and the DPB is disabled for operating in a reduced power mode of operation.

For example, CMOS circuits primarily consume electrical power when they switch states in a transition from logic HI to logic LO or from logic LO to logic HI. In many CMOS circuit applications, a majority of synchronous circuits are clocked at all times. By switching off the clock during periods where activity of the FCB is unimportant, power consumption of the DPB is advantageously decreased.

Figure 3:
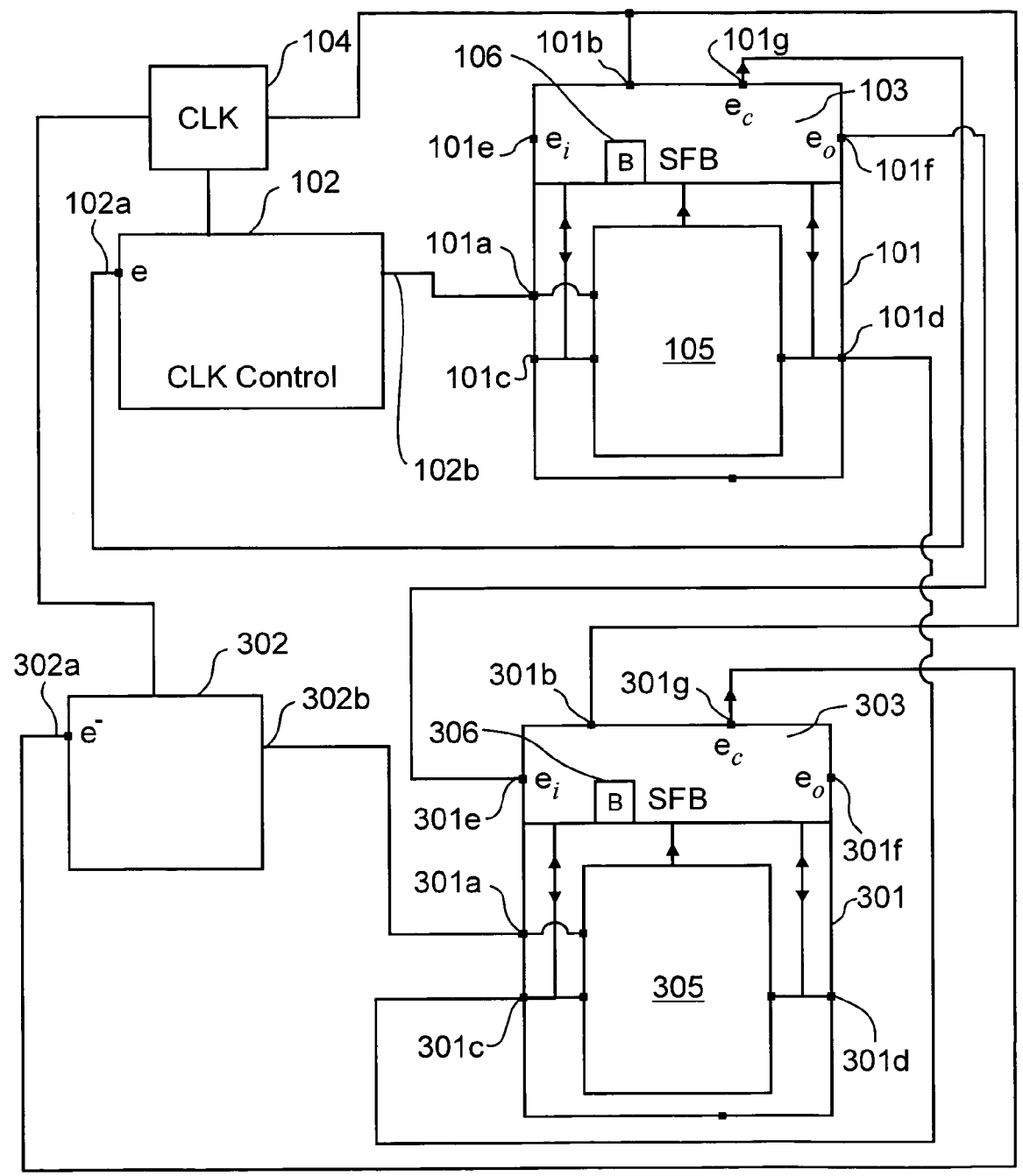
FIG. 3 illustrates two FCB circuits for use in a pipeline processing arranged in a sequential processing configuration.

FIG. 3 illustrates a plurality of FCBs, arranged in sequence for use with, for example, a pipeline processing stage. The pipeline processing stage is comprised of FCB 103, in the form of a first FCB, and a second FCB 301. The first FCB 103, clock circuit 104 and clock control circuit 102 are disposed as illustrated in FIG. 1. In addition, a second clock control circuit 302 is provided as illustrated in FIG. 3.

For the second FCB 301a sub-functional block (SFB) 303 is preferably disposed within the second FCB 301 for implementing a second clock control strategy. Additionally within the second FCB 301 there is disposed a data processing block (DPB) 305 that is comprised of a majority of the internal circuitry of the second FCB 301.

The clock circuit 104 provides a third clock signal to the second clock control circuit 302 and a first clock signal to a SFB clock input port 301b disposed on the second FCB 301. The first clock signal received on the SFB clock input port 301b is only for being received by circuitry forming the SFB 303. A FCB switched clock input port 301a is disposed on the second FCB 301 for receiving of the switched second clock signal from an output port 302b of the clock control circuit 302. The switched third clock signal is for being received by the DPB 305 disposed within the second FCB 301 and not by the SFB 303. A clock control port 301g is disposed on the second SFB 303 for switchably controlling the clock control circuit 302 using a clock control signal generated by the SFB 303. The switchable controlling of the clock control circuit 302 is in dependence upon the clock control strategy implemented within the SFB 303. Preferably, the clock control strategy is for achieving desired power consumption for the second FCB 301 as well as for achieving desired data throughput for the second FCB 301.

At least one data input port 301c and at least one data output port 301d are provided on the second FCB 301, with each port electrically connected to the DPB 305 and the SFB 303. A buffer memory circuit 306 is preferably disposed within the second FCB 301 for buffering of data received from the at least one data input port 301c and for buffering of data for being provided from the at least one data output port 301d. The SFB 303 monitors the at least one data input port 301c and the at least one data output port 301d to determine whether buffering of input data or processed data is to be performed.

A FCB control input port 301e is provided for receiving a FCB control signal for enabling and disabling of the DPB 305 portion of the FCB 301. The SFB 303 is coupled to the DPB 305 for receiving the FCB control signal and for enabling and disabling of the DPB 305. In an enabled state the second FCB operates in a normal mode of operation and consumes a normal amount of electrical power. In a disabled state the second FCB operates in a reduced power consumption mode of operation and consumes significantly reduced amounts of electrical power since the DPB 305 is disabled. Of course, the SFB 305 is still enabled and receives the first clock signal from the clock circuit 104. However the SFB 303 consumes significantly less power as compared to an enabled DPB 305.

A FCB control output port 101f is shown connected to a FCB control input port 301e of the second FCB, where the SFB 103 disposed within the FCB 101 uses this port 101f to control the second FCB 301 using the FCB control signal. The at least one data output port 101d of the first FCB 101 is coupled to the second FCB 301 at least one data input port 301c for providing processed data, processed by the first FCB 101, thereto.

In such a sequential organization of FCBs, the FCB 101 and the second FCB 301 are operated sequentially in dependence upon FCB control signals provided by the SFBs. Prior to being enabled by an external source or another FCB, each FCB consumes significantly reduced amounts of electrical power. The sequential organization of FCBs illustrated in FIG. 3 operates in accordance with those steps outlined in FIG. 4.

Figure 4:
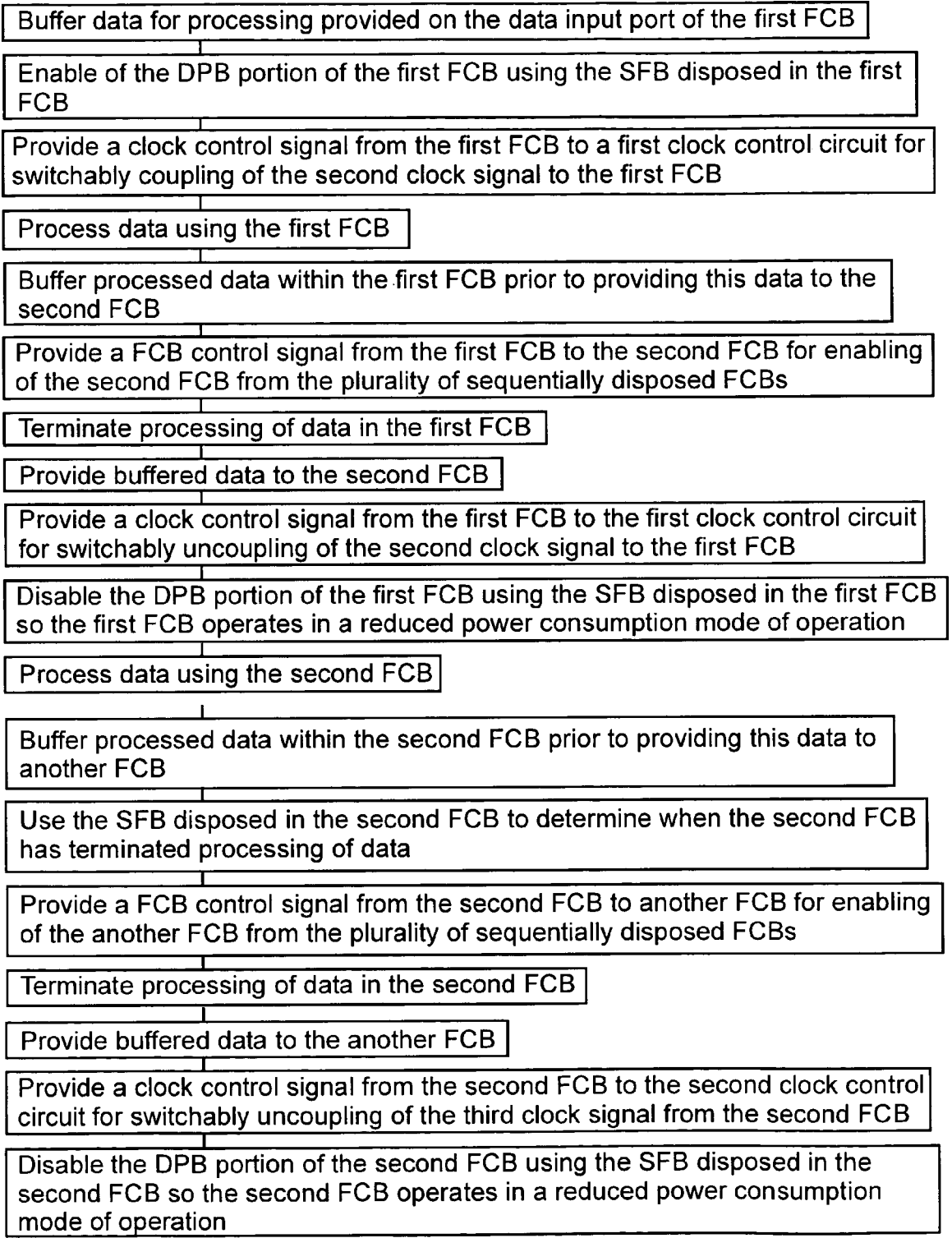
FIG. 4 illustrates operating steps for the sequential configuration of FCBs illustrated in FIG. 5 illustrates a master control circuit (MCC) having a plurality of clock enable ports and a plurality of clock signal output ports for connecting to a plurality of FCBs; and, FIG. 6 illustrates an outer FCB with first and second inner FCBs disposed within the DPB for processing of data received by the outer FCB.

As is illustrated in FIG. 4, the first FCB buffers data for processing that is provided on the at least one data input port of the first FCB, while the DPB portion of the first FCB is enabled using the SFB disposed in the first FCB. A clock control signal from the first FCB is provided to a first clock control circuit for switchably coupling of the second clock signal to the first FCB. The first FCB then processes the data. This processed data is buffered within the first FCB buffer memory prior to providing this data to the second FCB at least one data input port. A FCB control signal from the first FCB is provided to the second FCB for enabling of the second FCB and the first FCB terminates processing of data. Buffered data within the first FCB is provided to the second FCB and a clock control signal from the first FCB is provided to the first clock control circuit for switchably uncoupling of the second clock signal to the first FCB. The DPB portion of the first FCB now operates in a reduced power consumption mode of operation. The second FCB then processes data received from the first FCB, where data is buffered within the second FCB prior to providing this processed data to another FCB. The SFB disposed in the second FCB is used to determine when the second FCB has terminated processing of data and thereafter the SFB disposed on the second FCB provides a FCB control signal from the second FCB to another FCB for enabling of the another FCB from the plurality of sequentially disposed FCBs. The second FCB then terminates processing of data and provides this buffered data to the another FCB. A clock control signal is provided from the second FCB to the second clock control circuit for switchably uncoupling of the third clock signal from the second FCB and the DPB portion of the second FCB operates in the reduced power consumption mode of operation.

In this sequential FCB processing system as shown, only those FCBs that are actively processing of data are enabled and those not processing of data are disabled. Of course, the sequential processing system illustrated in FIG. 3 only shows two FCBs, however any number of FCBs is useable according to method steps outlined in FIG. 4.

Figure 5:
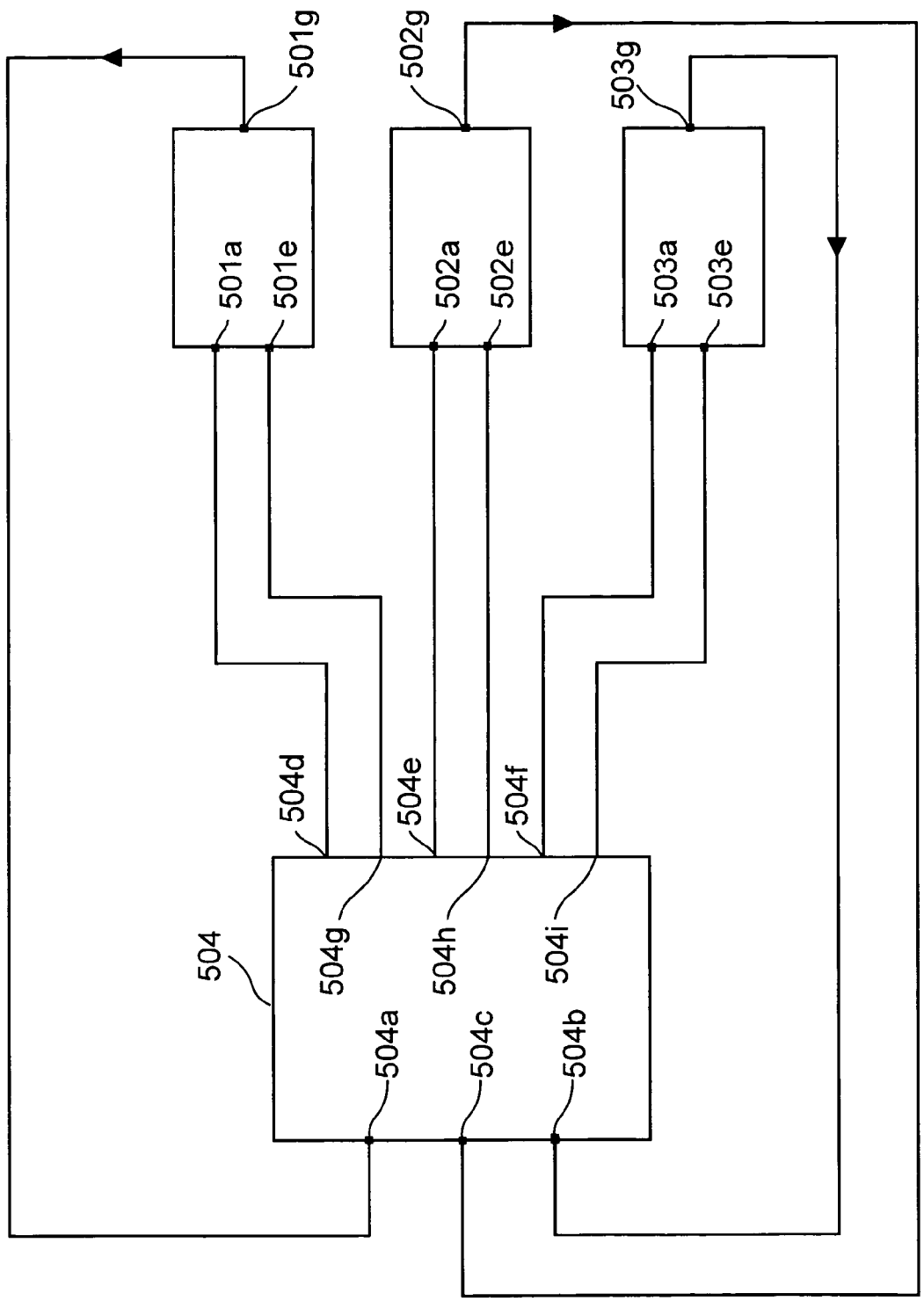

FIG. 5 illustrates a master control circuit (MCC) 504 having a plurality of clock enable ports 504a, 504b and 504c and a plurality of clock signal output ports 504d, 504e, 504f. A plurality of FCBs 501, 502 and 503, in the form of FCB 101 illustrated in FIG. 1, are provided with each FCB having its clock signal input port 501a, 502a and 503a connected to the plurality of clock signal output ports 504d, 504e, 504f, respectively. Clock control ports 501g, 502g and 503g are connected to the plurality of respective clock enable ports 504a, 504b and 504c. FCB control ports 501e, 502e and 503e are connected to a plurality of respective FCB control signal output ports 504g, 504h and 504i for providing a respective FCB control signal to the plurality of FCBs.

Each of the FCBs operates in accordance with the method steps outlined in FIGS. 2b, 2c and optionally 2d. Additionally, the MCC 504 controls the FCBs in dependence upon power consumption requirements and data throughput.

Preferably, a default clock control strategy is programmed into the MCC 504 at design time. Alternatively system power consumption or data throughput strategies are loaded into the MCC 504 while the system is in operation, allowing for a dynamic strategy according to the instantaneous requirements of the system. Since at least each FCB has its own clock control circuit coupled therewith, different FCBs implement different strategies independent of each other.

Advantageously, each FCB independently demands a clock signal for its use independent of the other FCBs. Thus, the power consumption reduction technique employed in each of the FCBs is essentially invisible to the other FCBs except to the extent that some delay is potentially incurred between FCBs when data buffering is performed therebetween while waiting for the DPB disposed within a newly enabled FCB to stabilize.

Figure 6:
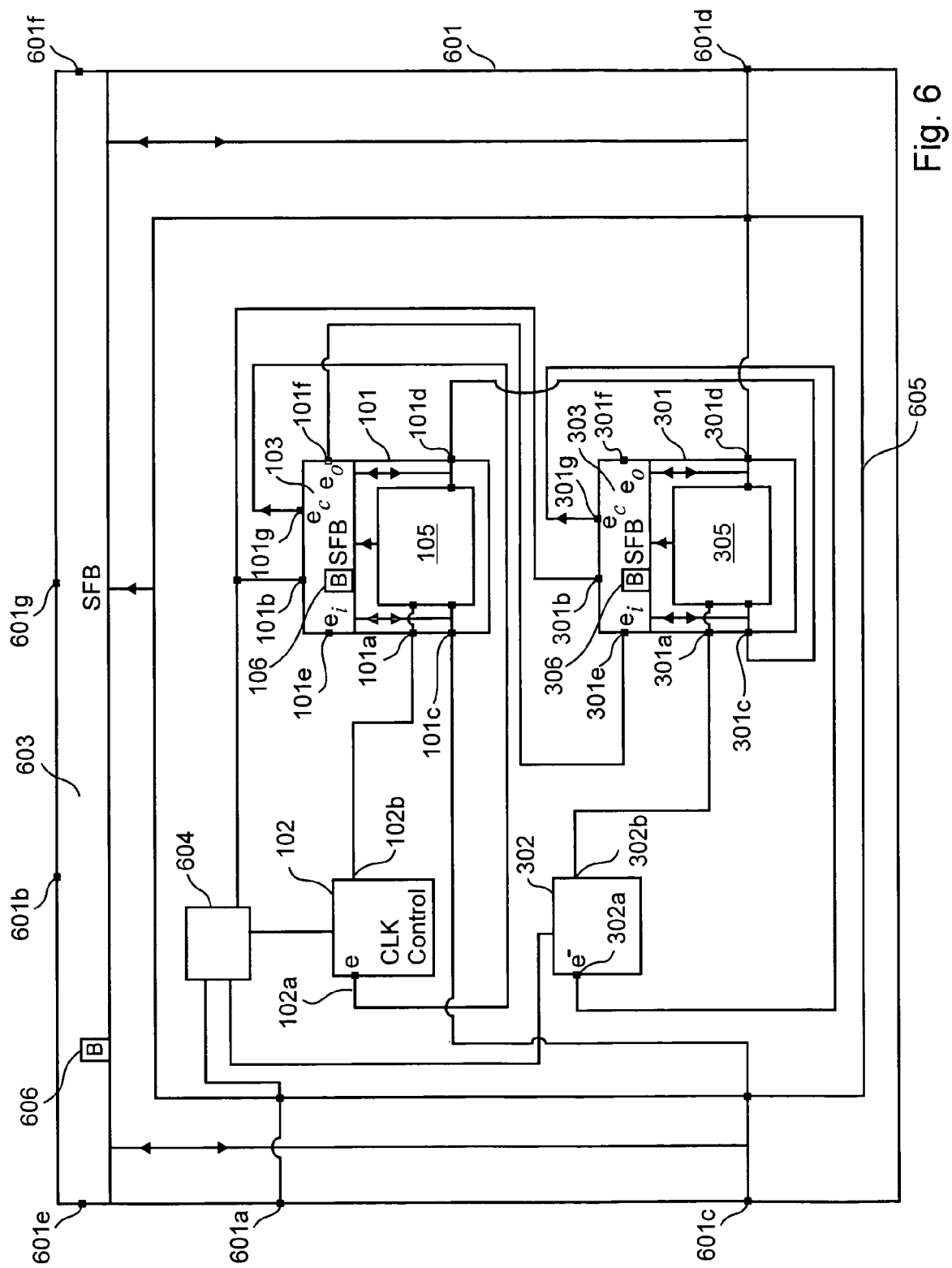

FIG. 6 illustrates an outer FCB 601 with first and second inner FCBs 101 and 301, coupled together similarly to that shown in FIG. 3. A sub-functional block (SFB) 603 is preferably disposed within the outer FCB 601 for implementing a clock control strategy. Additionally within the outer FCB 601 there is disposed a data processing block (DPB) 605 that is comprised of the first and second inner FCBs 101 and 301, forming a majority of the internal circuitry of the outer FCB 601. The outer FCB 601 is provided with a SFB clock input port 601b disposed on the outer FCB 601 for receiving a clock signal for the SFB 603.

A FCB switched clock input port 601a is disposed on the outer FCB 601 for receiving of a switched clock signal. The switched clock signal is provided to a frequency multiplier and divider circuit 604 disposed within the DPB 605. A clock control port 601g is disposed on the SFB 603 for switchably controlling a clock control circuit (not shown) using a clock control signal generated by the SFB 603. The switchable controlling of the clock control circuit (not shown) is in dependence upon the clock control strategy implemented within the SFB 603. Preferably, the clock control strategy is for achieving desired power consumption for the outer FCB 601 as well as for achieving desired data throughput for the FCB 601. This clock control strategy affects the operation of the first and second inner FCBs 101 and 301 disposed within the DPB 605.

At least one data input port 101c and at least one data output port 110d are provided on the outer FCB 601, with each port electrically connected to the DPB 605 and the SFB 603. A buffer memory circuit 606 is preferably disposed within the outer FCB 601 for buffering of data received from at least one of the data input ports 601c and for buffering of data for being provided from the at least one data output port 601d. In the configuration illustrated in FIG. 6, the at least one data input port 601c is coupled to the at least one data input port 101c of the first inner FCB 101. The at least one data output port 601d is coupled to the at least one data output port 301d of the second inner FCB 301 for receiving processed data therefrom. The SFB 603 monitors the at least one data input port 601c and the at least one data output port 601d to determine whether buffering of input data or processed data is to be performed.

A FCB control input port 601e is provided for receiving a FCB control signal for enabling and disabling of the DPB portion of the FCB. The SFB controls the enabling and disabling of the DPB 605 by switchably selecting the clock signal provided to the frequency multiplier and divider circuit 604. In an enabled state the FCB 601 operates in a normal mode of operation and consumes a normal amount of electrical power. Of course, this power consumption is dependent upon the power control strategies implemented within first and second inner FCBs 101 and 301. In a disabled state the FCB operates in a reduced power consumption mode of operation and consumes significantly reduced amounts of electrical power since the DPB is disabled, or at least portions thereof are disabled in dependence upon the power control strategies implemented within first and second inner FCBs 101 and 301. Of course, the SFB 601 is still enabled and receives the clock signal from the clock circuit (not shown). However the SFB 601 consumes significantly less power as compared to an enabled DPB 605. The frequency multiplier and divider circuit 604 generates the first, second and third clock signals that are provided to the first and second inner FCBs 101 and 301 in dependence upon the power control strategy implemented within the SFB 603.

Of course, the DPB 605 is not only for operating using a normal power consumption mode of operation or a reduced power consumption mode of operation, but any number of power consumption modes of operation are realizable by FCB. As illustrated in FIG. 6, if only the first inner FCB is operating with normal power consumption then the outer FCB has a power consumption that is reduced, but not reduced to a minimal power consumption of the outer FCB, but to a power consumption level therebetween.

Numerous other embodiments may be envisaged without departing from the spirit or scope of the invention.

What is claimed is:

1. A computing device comprising:
a clock circuit for generating a first clock signal, a second clock signal, and a third clock signal;
a first sub functional block (SFB) having an input port for receiving the first clock signal;
a second sub functional block (SFB) having an input port for receiving the first clock signal;
a first functional circuit block (FCB) including the first SFB and for operating in accordance with predetermined parameters, the first FCB having a clock control port for providing a copy of the first clock control signal, a first clock signal input port for receiving a switchably coupled second clock signal, a first FCB control input port and a first FCB control output port, the first FCB having a circuitry portion for operating in one of a normal mode of operation and in a reduced power consumption mode of operation in dependence upon the switchably coupled second clock signal;
a second functional circuit block (FCB) including the second SFB and for operating in accordance with predetermined parameters, the second FCB having a second clock control port for providing a second clock control signal, a second clock signal input port for receiving a switchably coupled third clock signal, a second FCB control input port and a second FCB control output, the second FCB having a circuitry portion for operating in one of a normal mode of operation and in a reduced power consumption mode of operation in dependence upon the switchably coupled third clock signal;
a first clock control circuit for receiving the second clock signal and for switchably coupling the second clock signal to the first clock signal input port in dependence upon the first clock control signal; and wherein
a master-slave relationship is established by at least one of the first FCB control output port being coupled to the second FCB control input port for receiving a FCB control signal from the first FCB for enabling and disabling of the second FCB circuitry portion and the second FCB control output port being coupled to the first FCB control input port for receiving a FCB control signal from the second FCB for enabling and disabling of the first FCB circuitry portion.

2. A computing device according to claim 1, comprising a second clock control circuit for receiving the third clock signal and for switchably coupling the third clock signal to the second clock signal input port in dependence upon the second clock control signal.

3. A computing device according to claim 1, wherein a plurality of power consumption modes of operation for the first FCB are achievable between the normal mode of operation and the reduced power consumption mode of operation.

4. A computing device according to claim 1, wherein a plurality of power consumption modes of operation for the second FCB are achievable between normal mode of operation and the reduced power consumption mode of operation.

5. A computing device according to claim 1, comprising a frequency multiplier and divider circuit coupled with the clock circuit for receiving of at least one of the first clock signal and the second clock signal for varying a frequency of at least one of the first clock signal and the second clock signal.

6. A computing device according to claim 1, comprising a frequency multiplier and divider circuit coupled with the first functional circuit block (FCB) the clock circuit for decreasing a frequency of the first clock signal when the first FCB is for operating in the reduced power consumption mode of operation.

7. A method of controlling power consumption:
providing a first FCB for processing data using a first clock signal provided by a first clock circuit;
providing a second FCB for processing data using a second clock signal provided by a second clock circuit;
receiving a FCB control signal by the first FCB and the second FCB;
determining whether the FCB control signal is for operating of at least one of the first FCB and the second FCB in one of a normal mode of operation and a reduced power consumption mode of operation;
performing one of enabling of at least one of the first clock circuit and the second clock circuit in dependence upon whether at least one of the first FCB and the second FCB are for operating in the normal mode of operation and varying a frequency of at least one of the first clock circuit and the second clock circuit in dependence upon whether at least one of the first FCB and the second FCB are for operating in the normal mode of operation; and
providing at least one of the first FCB control output port being coupled to the second FCB control input port for receiving a FCB control signal from the first FCB for enabling and disabling of the second FCB circuitry portion and the second FCB control output port being coupled to the first FCB control input port for receiving a FCB control signal from the second FCB for enabling and disabling of the first FCB circuitry portion.

8. A method according to claim 7, wherein determining comprises determining whether at least one of the first FCB and the second FCB are selected for processing of data.

9. A method according to claim 8, wherein the first FCB control signal is for varying a frequency of the second clock signal for the second FCB.

10. A method according to claim 8, comprising increasing a frequency of the first clock signal where the first FCB is for operating in the normal power consumption mode of operation.

11. A method according to claim 7, wherein operating in the reduced power consumption mode of operation comprises disabling a majority of internal circuitry within at least one of the first FCB and the second FCB.

12. A method according to claim 7, comprising decreasing a frequency of the second clock signal when the second FCB is for operating in the reduced power consumption mode of operation.

13. A method according to claim 12, comprising increasing a frequency of the second clock signal when the second FCB is for operating in the normal power consumption mode of operation.

14. A method comprising:
providing a first functional circuit block (FCB) for processing of data using a first clock circuit;
providing a second FCB for processing of data using a second clock circuit;
switchably enabling and disabling the first and second clock circuits independently independence upon performance requirements of the first and second FCBs; and
establishing a master-slave relationship by at least one of coupling a first FCB control output port to a second FCB control input port for receiving a FCB control signal from the first FCB for enabling and disabling of the second FCB circuitry portion and coupling a second FCB control output port to a first FCB control input port for receiving a FCB control signal from the second FCB for enabling and disabling of the first FCB circuitry portion.

15. A method according to claim 14, comprising determining whether at least one of the first FCB and the second FCB are for processing of data, where at least one of the first and second clock circuits are disabled when the at least one of the first FCB and the second FCB are other then for processing of data.

16. A computer readable storage medium having stored therein data according to a predetermined computing device format, and upon execution of the data by a suitable computing device a design procedure for providing a design of a computing device is provided, comprising:
a clock circuit for generating a first clock signal, a second clock signal, and a third clock signal;
a first sub functional block (SFB) having an input port for receiving the first clock signal;
a second sub functional block (SFB) having an input port for receiving the first clock signal;
a first functional circuit block (FCB) including the first SFB and for operating in accordance with predetermined parameters, the first FCB having a clock control port for providing a copy of the first clock control signal, a first clock signal input port for receiving a switchably coupled second clock signal, a first FCB control input port and a first FCB control output port, the first FCB having a circuitry portion for operating in one of a normal mode of operation and in a reduced power consumption mode of operation in dependence upon the switchably coupled second clock signal;
a second functional circuit block (FCB) including the second SFB and for operating in accordance with predetermined parameters, the second FCB having a second clock control port for providing a second clock control signal, a second clock signal input port for receiving a switchably coupled third clock signal, a second FCB control input port and a second FCB control output, the second FCB having a circuitry portion for operating in one of a normal mode of operation and in a reduced power consumption mode of operation in dependence upon the switchably coupled third clock signal;

a first clock control circuit for receiving the second clock signal and for switchably coupling the second clock signal to the first clock signal input port in dependence upon the first clock control signal; and wherein a master-slave relationship is established by at least one of the first FCB control output port being coupled to the second FCB control input port for receiving a FCB control signal from the first FCB for enabling and disabling of the second FCB circuitry portion and the second FCB control output port being coupled to the first FCB control input port for receiving a FCB control signal from the second FCB for enabling and disabling of the first FCB circuitry portion.

17. A computer readable storage medium having stored therein data according to a predetermined computing device format, and upon execution of the data by a suitable computing device a procedure for controlling power consumption is provided, comprising:

providing a first FCB for processing data using a first clock signal provided by a first clock circuit;

providing a second FCB for processing data using a second clock signal provided by a second clock circuit;

receiving a FCB control signal by the first FCB and the second FCB;

determining whether the FCB control signal is for operating of at least one of the first FCB and the second FCB in one of a normal mode of operation and a reduced power consumption mode of operation;

performing one of enabling of at least one of the first clock circuit and the second clock circuit in dependence upon whether at least one of the first FCB and the second FCB are for operating in the normal mode of operation and varying a frequency of at least one of the first clock circuit and the second clock circuit in dependence upon whether at least one of the first FCB and the second FCB are for operating in the normal mode of operation; and providing at least one of the first FCB control output port being coupled to the second FCB control input port for receiving a FCB control signal from the first FCB for enabling and disabling of the second FCB circuitry portion and the second FCB control output port being coupled to the first FCB control input port for receiving a FCB control signal from the second FCB for enabling and disabling of the first FCB circuitry portion.

* * * * *